United States Patent [19]
van Hoff et al.

[11] Patent Number: 5,778,231
[45] Date of Patent: Jul. 7, 1998

[54] COMPILER SYSTEM AND METHOD FOR RESOLVING SYMBOLIC REFERENCES TO EXTERNALLY LOCATED PROGRAM FILES

[75] Inventors: Arthur A. van Hoff, Mountain View; James A. Gosling, Woodside; Frank Yellin, Redwood City, all of Calif.

[73] Assignee: Sun Microsystems, Inc., Mountain View, Calif.

[21] Appl. No.: 575,356

[22] Filed: Dec. 20, 1995

[51] Int. Cl.$^6$ .................................................. G06F 9/45
[52] U.S. Cl. ............................................. 395/705; 395/712
[58] Field of Search ..................................... 395/703, 710, 395/712, 685, 705, 412

[56] References Cited

U.S. PATENT DOCUMENTS

| | | | |
|---|---|---|---|
| 4,558,413 | 12/1985 | Schmidt et al. | 364/300 |
| 4,809,170 | 2/1989 | Leblang et al. | 364/200 |
| 5,204,960 | 4/1993 | Smith et al. | 395/700 |
| 5,291,601 | 3/1994 | Sands | 395/700 |
| 5,414,854 | 5/1995 | Heninger et al. | 395/700 |
| 5,630,066 | 5/1997 | Gosling | 395/200.09 |
| 5,649,186 | 7/1997 | Ferguson | 395/610 |

OTHER PUBLICATIONS

R. A. Gingell, M. Lee, X. T. Dang, M. S. Weeks, "Shared Libraries in SunOS", Proc. Summer of 1987 USENIX Conf., pp. 131-145, Jun. 8, 1987.

Ken Thompson, "Regular Expression Search Algorithm," *Communications of the ACM*, Jun. 1968, vol. 11, No. 6, pp. 419-422.

Kin-Man Chung and Herbert Yuen, "A 'Tiny' Pascal Compiler; Part 1: The P-Code Interpreter," *Byte Publications, Inc.*, Sep. 1978.

Kin-Man Chung and Herbert Yuen, "A 'Tiny' Pascal Compiler; Part 2: The P-Compiler," *Byte Publications, Inc.*, Oct. 1978.

Gene McDaniel, "An Analysis of a Mesa Instruction Set," *Association for Computing Machinery*, May 1982.

Kenneth A. Pier, "A Retrospective on the Dorado, A High-Performance Personal Computer," *IEEE Computer Society, 10th Annual Intl. Symposium on Computer Architecture*, 1983, pp. 252-269.

James G. Mitchell, et al., "Mesa Language Manual," *Xerox Corporation, Palo Alto Reserach Center*.

*Primary Examiner*—Alvin E. Oberley
*Assistant Examiner*—Sue Lao
*Attorney, Agent, or Firm*—Gary S. Williams; Flehr Hohbach Test Albritton & Herbert LLP

[57] ABSTRACT

A program compiler identifies each symbol in a source program that references another program. For each identified symbol, the compiler determines whether the symbol is a reference to a remotely located file or to a locally stored file. If the identified symbol is a reference to a remotely located file, it constructs a file location identifier, such as a URL, for the identified symbol, performs a file location identifier based fetch of the remotely locate file, and ads at least a portion of the fetched file to a set of program code to be compiled if the fetch is successfully performed. If the identified symbol is a reference to a locally stored file, it performs a file fetch for the locally stored file, adding at least a portion of the fetched file to the set of program code to be compiled if the file fetch is successfully performed. If the fetch is unsuccessful, compilation of the source program is aborted. When a client computer attempts to initiate execution of a specified program, the program executed determines a source update date associated with a source program associated with the specified program and also determines if a compiled version of the source program is present on the client computer. If a compiled version of the source program is present, the program executer determines a last compile date for the compiled version and compares the last compile date with the last source update date. If a compiled version of the source program does not exist on the client computer or if the source update date is later than the last compile date, the source program is automatically compiled to generate a new compiled version.

16 Claims, 2 Drawing Sheets

COMPILER SYSTEM AND METHOD FOR RESOLVING SYMBOLIC REFERENCES TO EXTERNALLY LOCATED PROGRAM FILES

The present invention relates generally to distributed computer systems, and more particularly to a compiler system and method in which a source program may reference, via symbols, programs stored at remote locations such as at locations external to the computer system on which the compiler system is operating.

BACKGROUND OF THE INVENTION

In conventional compiler systems, all symbolic references must be resolved during compilation. This typically requires that the program source code being compiled contain explicit forward declaration statements, include statements, and like programming constructs so that the compiler understands the nature of the symbol and can resolve the symbol before encountering the symbol in the executable statements themselves. These forward declarations, include statements, and the like programming constructs are typically provided in the source code sequentially ahead of any executable code statements or other executable procedures, and may reside in a header records. Conventional compilation methods also rely on having all supplemental code segments, such as code segments from associated libraries, available on the machine performing the compilation at the time of compilation. Conventional compilers are incapable of successfully completing compilation unless these requirements are satisfied and typically cannot suspend the compilation process to locate or resolve a symbol or to fetch a supplemental code segment that is not immediately available on the compiling computer.

Conventional systems also typically rely on one of two approaches assuring that any stored version of compiled source code corresponds to the latest version of the program source code. First, conventional systems have relied on a human comparison of the date of the last source code update and the date of the last compilation. If the source code has been modified or updated more recently than the compiled code, then the user requiring execution of the program compiles the new source code prior to execution. Other conventional systems may be maintained in a manner that each time the source code is modified it is also compiled so that a current version of the compiled code is always available for execution. However, this second procedure, though more formal, still effectively involves human comparison and intervention.

Therefore one object of the present invention is to provide structure and method for a compiler that can resolve symbolic references as they are encountered in the source code.

Another object of the present invention is to provide a structure and method for a compiler that can temporarily suspend compilation to fetch any required supplemental code segments from external locations without aborting the compilation itself.

A further object of the present invention is to provide a structure and method for comparing, prior to execution of program code, the last update date of the corresponding source code and the last compile date of the compiled binary code, and automatically initiating recompilation of the program source code when the source code is more recent than the compiled code.

Another object of the present invention is to provide a structure and method that provides for constructing executable code at a particular site on the Internet by resolving symbols and fetching any required supplemental code segments from other locations and diverse authors on the Internet.

SUMMARY OF THE INVENTION

In summary, the present invention provides method and structure for an advanced application program code compiler that incorporates date checking features, and run time symbol resolution features that allow for robust performance on a computer network such as the Internet.

The inventive compilation method for compiling program source code on a computer to generate compiled code includes identifying symbol references in the source code sequentially as the symbolic references occur in the source code, and parsing the code during the compilation to identify each symbol that references another program. If the identified symbol is a reference to a remotely located file, then a file location identifier is constructed for the identified symbol, and a file fetch of the remotely locate file based on that location identifier is performed. If the identified symbol is a reference to a locally stored file, then a file fetch of the locally stored file is performed. A portion of the fetched file is added or merged to the set of program code being compiled if the fetch is successfully performed. If the symbol cannot be resolved either locally or on the network, the compilation is aborted.

Another embodiment of the inventive method includes determining the date of the last modification of the program source code with the date of the available compiled code for that same application program. The dates are stored in the respective source and compiled code files. The source code is automatically recompiled if the compiled code is older than the source code. A compiler system incorporating the inventive method is also provided.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
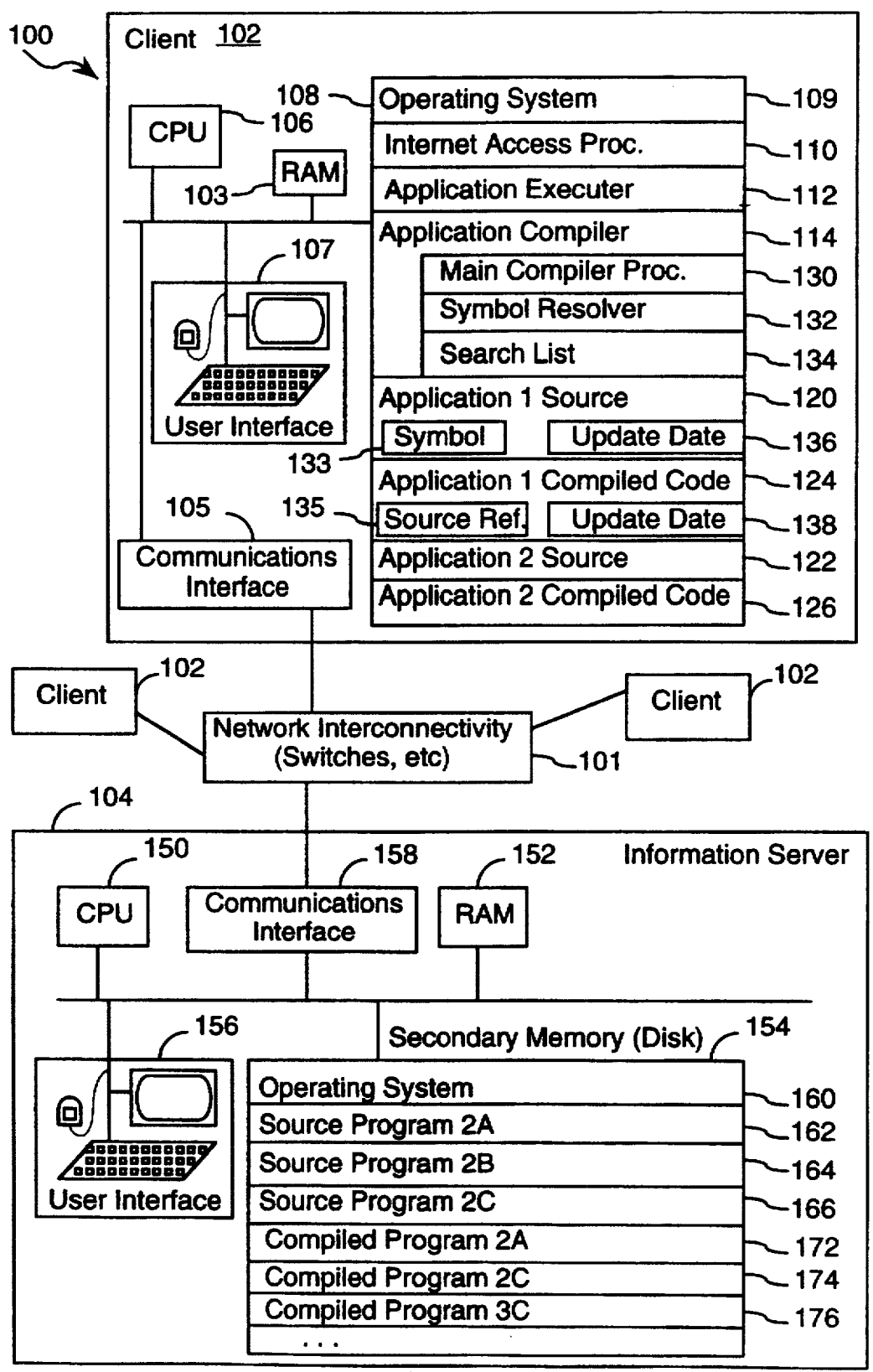
FIG. 1 is a block diagram of a distributed computer system incorporating an embodiment of the present invention.

Referring to FIG. 1, there is shown a distributed computer system 100 having many client computers 102 and at least one remotely located information server computer 104. In the preferred embodiment, each client computer 102 is connected to the information server 104 via the Internet 101, although other types of communication connections or network interconnectivity could be used. While most client computers are desktop computers, such as Sun workstations, IBM compatible computers and Macintosh computers, virtually any type of computer can be a client computer. In the preferred embodiment, each client computer includes a fast random access memory (RAM) 103, a communication interface 105 for communication with information server 104 via communications network 101, a CPU 106, a user interface 107, and memory 108 for storing an operating system 109, an Internet access program 110, an application execution procedure 112, and an application compiler procedure 114. Also stored in client computer's memory 108 in the preferred embodiment are compiled application programs 124, 126 and application source programs 120,122. Co-locating the source and compiled code permits comparisons of the source and compiled code so that only the current version of compiled code, that is compiled code corresponding to the latest source code, is executed when execution is requested by the user associated with a client computer 102.

The application compiler 114 includes a main compiler procedure 130 that employs established compiler technology except with respect to the features discussed below. In particular, application compiler 114 includes a symbol resolver 132 for resolving references, in the form of symbols 133, to other programs, and a search list 134 representing locations to be searched for such other programs.

In the preferred embodiment of the present invention application source programs 120,122 also each include an embedded source update date 136 indicating the last time the source program was revised, and application compiled programs 124,126 also each include an embedded compiled update date 138 indicating the last time the corresponding application source program was compiled. Alternately, the compiled update date 138 may indicate the date of source code corresponding to the compiled program. The update dates 136,138 preferably contain day/month/year and hour-:minute:second type parameters.

Figure 2:
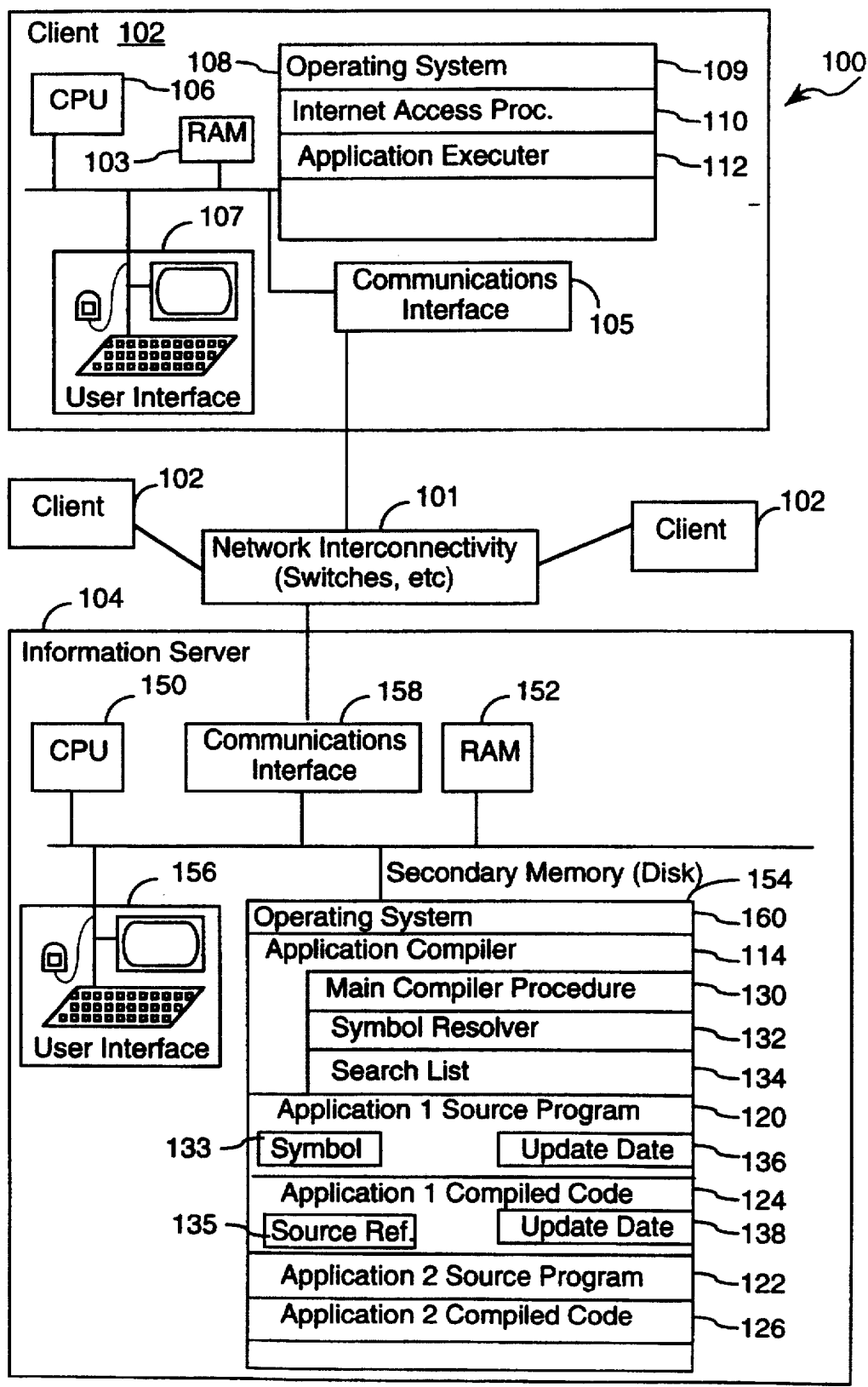
FIG. 2 is a block diagram of a distributed computer system incorporating an alternative embodiment of the present invention.

In other embodiments of the invention, such as the embodiment illustrated in FIG. 2, either or both of compiled application programs 124,126 and application source programs 120,122, may be stored in the client computer's memory 108 or at other locations outside of client computer 102, such as on information server 104 or any other location on network 100. In this alternate embodiment, upon user request for program execution, application execution procedure 112 makes a request from the program and the program code is retrieved to the client computer along with any other code segments required by the selected program for execution.

In general, application compiler 114, application source programs 120, 122, and application compiled code 124,128 may be located either on the client computer, on information server 104, or on another network site, such as a application compilation server whose express purpose and function is to provide current compilations for source code from a predetermined set of providers.

Search list 134 may include entries for locations within the file system of local client computer 102 and locations at other sites on the distributed computer system network 100 that may contain source programs referenced by the program being compiled. For example, search list 134 may include a set of file path definitions or object class repository locations for locating the file referenced by a symbol. Search list 134 would typically list local libraries of programs first, followed by other locations (if any) on the network.

Symbol resolver 132 includes a predetermined set of rules or procedures that direct the search to resolve a symbol. For example, the rules may include default parameters directing symbol resolver 132 to search the local client computer's file system first in its attempt to resolve the symbol, and then to search other sites on the distributed computer system (network) 100 in a particular manner until the symbol is resolved. If a symbol does not reference a locally stored program, then parsed portions of the symbol are compared with a known set of Internet site names. The set of known Internet site names may be obtained from a distributed naming service (DNS) or other service that maintains a list of the names and aliases of known Internet sites.

Application execution procedure 112 is responsible for initiating execution of a program requested by the user associated with client computer 102. The user may, for example, identify a program for execution while accessing the Internet using Internet access program 110 or may already have a version of the source or compiled source locally. Upon the user's request for execution, application execution procedure 112 is invoked, and initiates a series of actions that depend in part on whether source code and/or compiled code are available on the requesting computer.

In the preferred embodiment of the invention, both the source code and a version of compiled code are maintained and available on the local computer. Under these circumstances, the source code is parsed or otherwise interrogated to read source update date 136, and the compiled code corresponding to the source code is parsed or otherwise interrogated to read compiled code update date 138. If the compiled code update date is the same as or later than the source code update date, then the existing compiled code 124 is based on the latest version of the source code 120 and is up to date; no recompilation is necessary. However, if the compiled code update date is earlier than the source code update date, then the existing compiled code 124 is based on an earlier and perhaps out-of-date version of source code 120 and recompilation is necessary.

When no recompilation of the code is required, and by implication when all symbolic references have been resolved, the application execution procedure 112 initiates execution of the requested program in conventional manner.

If recompilation of the source code is required, either because no compiled code is available or because the compiled code corresponds to an out of date source code version, then Application Compiler 114 is invoked. The main compiler procedure 130 operates in conventional manner until a symbol is encountered in the instruction stream. At that time a call is made to symbol resolver 132 to resolve the symbolic reference. As already described, the symbol resolver attempts to resolve any symbolic references by querying the local computer file structure and other sites on the network until the symbol can be resolved. The symbol resolver 132 operates in conjunction with the search list 134 to define the manner in which the symbols are resolved. After compilation is complete, the application execution procedure 112 initiates execution of the requested program in conventional manner.

In the alternate embodiments of the invention where either the source, or the compiled code, or both are not stored on local client computer 102, then alternate procedures are followed after a request for execution has been made by the user. If the source is not available on the client computer so that no comparison between source and compiled dates may be made locally, then either the user may be given the option of: (1) executing the available compiled code, (2) initiating a comparison of dates by sending a request for the date code of the associated program source file, or (3) requesting download of the associated source code so that the comparison is made locally and if necessary the source is recompiled. A source reference location identifier 135 is provided in the compiled code to facilitate such request and date comparison. The source reference location identifier 135 preferably includes a unique file identifier for locating the file on the network, such as a URL.

If both compiled program 124, 126 and corresponding application source program 120, 122 are available on client computer 102 at the time program execution is requested, application execution procedure 112 compares the embedded complied update date 138 and the embedded source update date 136 may be compared to determine if the source code is newer than the existing compiled code. If the compiled code is older, application compiler procedure 114 initiates recompilation of the source code to generate an updated version of the compiled code. The compiled code update date 138 stored in memory 108 is also modified to reflect the later date of this new compilation. If the source code is not available, then the comparison is not performed and the existing compiled code is used.

The information server 104 includes a central processing unit 150, primary memory 152 (i.e., fast random access memory) and secondary memory 154 (typically disk storage), a user interface 156, a communications interface 158 for communication with client computers 102 via communications network 101. For the purposes of the present discussion, it will be assumed that the information server's secondary memory 154 stores: an operating system 160, and program source files 162,164, 166. The information servers secondary memory may also store compiled versions 172, 174,176, of the program source files, either corresponding to the stored program files or in addition to such program source files. For reasons of security, some application program providers may restrict access or distribution of program materials on the Internet to compiled code.

The symbol resolver 132 and search list 134 of application compiler procedure 114 provide distinct advantages over conventional systems. In conventional computer programming languages (such as C or C++, for example) symbols or references must be declared in the source code before they occur or are used in a subsequent source code statement. The explicit declarations, include statements, and the like constructs, are typically provided in a header to the source code file ahead of the actual executable code statements.

One object of the present invention is to provide a structure and method for resolving symbol references during compilation as they occur in the source code without any need for forward declarations, include statements, and the like programming constructs. The application compiler 114 contains a parser within the main compiler 130 which parses the code during compilation to identify externally defined symbols. A set of rules are established within the compiler for determining whether the symbolic reference is to a code segment within the file system of client computer 102 on which the compilation is being performed, or a reference to a file at a different location on network 100. If the reference is a network type reference then the symbol resolver determines the reference location (e.g., using information about known Internet sites obtained from a distributed name server) and constructs a URL that indicates the location of the relevant file. In the preferred embodiment, the referenced filed may be either a compiled program or a source file. Whether the binary file or the source file are sent to the client may be determined by predetermined rules defined by the code provider at the URL location, or selected by the user. Typically, a code provider would be expected to maintain a version of the compiled binary code that corresponds to the latest version of the source code so that unless the source code is required at the client computer, and the client is allowed access to the source code, the compiled code would be transmitted.

As indicated previously, when the symbol in the program undergoing compilation is mapped to a location external to client computer 102, the symbol is mapped to a URL. For example, the code may contain a reference to the symbol "SUN.COM.XFILE." Application compiler 112 includes instructions, including symbol resolver 132, that recognizes that the SUN.COM.XFILE reference is not within the local client computer file structure, but rather is a reference to a file at another location on the network. Once the compiler 114 determines that symbol 133 references another location on the network, the compiler creates a URL that is a reference to the Internet address SUN.COM.XFILE and initiates a fetch of the file named "XFILE" from site location "SUN.COM". The application compiler 112 in conjunction with Internet Access Procedure 110 then requests the file named "XFILE" from server 104 or other network location at address SUN.COM storing the file and in response to that request, is sent XFILE over the network. All symbols 133 are preferably resolved in the order that they are encountered in the source program 120 and once all symbols have been resolved, compilation may be completed.

The compiler 114 effectively extends the conventional local compilation paradigm which required that all of the code be available on the local machine 102 (e.g. the client computer), to a network compilation paradigm which supports compilation so long as any referenced code segments are available and accessible at some location on network 100. The inventive compiler 114 performs a URL based file fetch for the referenced symbol to any location on the network, and these fetches occur dynamically during compilation. In the context of this description, the term "symbol" refers to any reference to a program, subroutine, library function or other executable code stored internal to local client computer 102 or at any remote location on network 100.

As each piece of code referenced by a symbol is received in response to a fetch, the compiler adds at least a portion of the received file (i.e., the portion containing the procedure or function referenced by the symbol) to the set of code to be compiled. It is unnecessary to define the entire set of code required for compilation or execution in advance, it is only necessary to define the top level function or procedure. The procedures themselves reference other procedures, which may also reference other procedures. This run time assembly of code segments from the network permits rapid distribution of code enhancements to users. All of the components required by the top level procedure will be brought in as needed.

Although some conventional compilers may be able to complete compilation under certain restricted conditions even when some symbolic referenced are unresolved, such as for example by concurrently issuing a warning that symbol references are unresolved and will or may result in errors, the present inventive compiler resolves all references so long as information for resolving the reference is available on the network (either locally or at an external network site).

By way of summary, the preferred embodiment of the invention includes three compiler features for resolving symbols not provided or supported by conventional compilers. First, forward declarations are permitted, but the entire source file is preferably loaded before symbols within the file are resolved. Secondly, symbols are resolved by automatically locating the corresponding program file locally or by determining the corresponding program file's URL when the corresponding program file is not stored locally, thereby avoiding any conventional need for include statements and explicit forward declarations. Third, when both source and compiled program files are available, or can be obtained from the network, the last modification date of a compiled program is compared with the last modification date of the corresponding source program, and in response to the comparison the compiler is automatically invoked if the source program is more recent. This assures the user of having the most up-to-date version of the program.

The storage of source program update date 136 and compiled program update date 138 within the respective source code 120 and compiled code 124 provide advantages over conventional systems. These advantages are particularly apparent in an Internet environment where code is authored by a diverse community and code segments are expected to integrate at compilation time.

The date comparisons may also be extended to cover multiple program segments that have been integrated in a package in some manner. For example, consider a multimedia program package that includes text processing program segments, static image processing program segments, and real-time video processing program segments, each of which may be executed separately or in an integrated manner. It may be advantageous to identify the program source program update date for each of the three components, and compare the latest source program update date with the compiled program date for each segment. Then, if the date associated with any compiled program is earlier than the latest source program update date, recompilation of the source program is automatically initiated. While such recompilation may not be required where links to the other program segments do not occur, in some cases such forced recompilation would assure the user that all features in the integrated package are consistent and will perform in an optimum manner.

In the preferred embodiment of the present invention source programs are written in the Java language, marketed by Sun Microsystems, Inc. The program statements in Java language programs are called bytecodes. Java language programs are executable on a "virtual machine" through the use of a Java program interpreter. The virtual machine for which a source program has been written is mapped by the Java interpreters on various different computer platforms to execute the program on those real physical processors in conjunction with a particular operating system. For example, the virtual machine may be mapped onto processors made by Intel, Apple Computer, Company, Sun Microsystems, and so forth. Example of compilation to a virtual machine is described in the book by Tim Ritchey titled Java! and published by New Riders Publishing, Indianapolis Ind. in 1995, which book is hereby incorporated by reference.

In reference to Table 1, which provides an exemplar of an embodiment of the method of the present invention, there is shown a Pseudocode Representation of the program executer and compiler method. Under the program execution procedure, if a compiled version of a program does not exist, or if the update source date 136 of the source of program to be executed is later than compile update date 138 of compiled version of the program of interest, then compilation or recompilation of the program is initiated.

TABLE 1

Pseudocode Representation of Program Executer and Compiler Method

Program Execution Procedure (Program)
{
If Compiled Version of Program does not exist, or Update Date of Source of Program is later than Update Date of Compiled Version of Program
 {
 Initiate Compilation or Recompilation of Program TABLE 1-continued Pseudocode Representation of Program Executer and Compiler Method

```
{
While compiling program, resolve each Symbol that references
  another program:
  {
  Parse Symbol
  If Symbol is an Internet reference to a remotely located file
    {
    Construct URL for the symbol
    Perform URL based fetch of the remotely located file
    If Fetch is unsuccessful
      {Abort compilation with appropriate message to user}
    Add the code in the received file to the set of code to be
      compiled
    }
  Else
    {
    Search for referenced program in the resources listed in a
      predefined Search List
    Attempt to fetch the referenced program
    If Fetch is unsuccessful
      {Abort compilation with appropriate message to user}
    Add the code in the fetched file to the set of code to be
      compiled
    }
  }
 }
}
```

While compiling or recompiling the program, each symbol 133 that references another program is resolved. Each symbol is parsed in turn, and if the symbol is an Internet reference to a remotely located file a Universal Locator Reference (URL) is generated or constructed for the symbol, and a URL based fetch is initiated for the remotely located file. If the fetch is successful, the fetched code in the received file is added to the set of code in which the reference was found, so that the complete code may be compiled. If the fetch is unsuccessful, the compilation is aborted, and the user is provided with an appropriate status message.

If the a symbol is not a reference to a remotely located file on the Internet, then a search for the referenced program is initiated from among the resources listed in a predefined Search List. Again, if the fetch is successful, the fetched code in the received file is added to the set of code in which the reference was found, so that the complete code may be compiled. If the fetch is unsuccessful, the compilation is aborted, and the user is provided with an appropriate status message.

Once all symbols 133 have been resolved and all required code segments have been added to the set of code to be compiled, the set of code is compiled and the compile update date 138 for that particular program is updated to reflect the current compile date.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for compiling program source code on a computer to generate compiled code, said method comprising the steps of:

identifying each symbol in said source code that references another program;

for each identified symbol, determining whether said symbol is a reference to a remotely located file or to a locally stored file, and if said identified symbol is a reference to a remotely located file, constructing a file location identifier for said identified symbol, performing a file location identifier based fetch of said remotely locate file, and adding at least a portion of said fetched file to a set of program code to be compiled if said fetch is successfully performed, and otherwise aborting compilation of said source program; and if said identified symbol is a reference to a locally stored file, performing a file fetch for said locally stored file, adding at least a portion of said fetched file to said set of program code to be compiled if said file fetch is successfully performed, and otherwise aborting compilation of said source program.

2. The method of claim 1, further comprising the step of:

determining a source update date associated with said program source code;

determining if a compiled version of said program source code is present on said computer;

if a compiled version of said program source code is present on said computer, determining a last compile date for said compiled version, indicating when said compiled version was compiled;

comparing said last compile date with said last source update date; and if a compiled version of said program source code does not exist on said computer or if said source update date is later than said last compile date, compiling said program source code to generate a new compiled version.

3. The method in claim 2, wherein said remotely located file is located on a remote Internet site.

4. The method in claim 3, wherein said file location identifier is a URL on the Internet.

5. The method in claim 4, wherein said file location identifier based fetch is a URL based fetch.

6. The method of claim 2, wherein said method further comprises executing said program immediately after said compilation is complete.

7. A compiler system for generating compiled binary code from source code on a distributed computer system having a plurality of computer sites, said compiler system comprising:

a parser for parsing source code during compilation to identify symbols in the source code that reference other programs;

a symbol resolver for determining whether each identified symbol is a reference to a remotely located file or to a locally stored file, and if said identified symbol is a reference to a remotely located file, for constructing a file location identifier for said identified symbol;

said symbol resolver including instructions for;

if said identified symbol is a reference to a remotely located file, performing a file location identifier based fetch of said remotely locate file, and adding at least a portion of said fetched file to a set of program code to be compiled if said fetch is successfully performed, and otherwise aborting compilation of said source program; and if said identified symbol is a reference to a locally stored file, performing a file fetch for said locally stored file, adding at least a portion of said fetched file to said set of program code to be compiled if said file fetch is successfully performed, and otherwise aborting compilation of said source program.

8. The compiler system of claim 7, including:

update date comparison means for:

determining a source update date associated with said program source code;

determining if a compiled version of said program source code is present on said computer;

if a compiled version of said program source code is present on said computer, determining a last compile date for said compiled version, indicating when said compiled version was compiled;

comparing said last compile date with said last source update date; and if a compiled version of said program source code does not exist on said computer or if said source update date is later than said last compile date, compiling said program source code to generate a new compiled version.

9. The compiler system of claim 8, wherein said file location identifier is a URL on the Internet.

10. The compiler system of claim 9, wherein said file location identifier based fetch is a URL based fetch.

11. The compiler system of claim 8, including:

a search list stored in memory for defining a set of resources to be searched for locating locally stored files corresponding to ones of said identified symbols.

12. A computer program product for use in conjunction with a computer system, the computer program product comprising a computer readable storage medium and a computer program mechanism embedded therein, the computer program mechanism comprising:

a parser for parsing source code during compilation to identify symbols in the source code that reference other programs;

a symbol resolver for determining whether each identified symbol is a reference to a remotely located file or to a locally stored file, and if said identified symbol is a reference to a remotely located file, for constructing a file location identifier for said identified symbol;

said symbol resolver including instructions for:

if said identified symbol is a reference to a remotely located file, performing a file location identifier based fetch of said remotely locate file, and adding at least a portion of said fetched file to a set of program code to be compiled if said fetch is successfully performed, and otherwise aborting compilation of said source program; and if said identified symbol is a reference to a locally stored file, performing a file fetch for said locally stored file, adding at least a portion of said fetched file to said set of program code to be compiled if said file fetch is successfully performed, and otherwise aborting compilation of said source program.

13. The computer program product of claim 12, including:

update date comparison instructions for:

determining a source update date associated with said program source code;

determining if a compiled version of said program source code is present on said computer;

if a compiled version of said program source code is present on said computer, determining a last compile date for said compiled version, indicating when said compiled version was compiled;

comparing said last compile date with said last source update date; and if a compiled version of said program source code does not exist on said computer or if said source update date is later than said last compile date, compiling said program source code to generate a new compiled version.

14. The computer program product of claim 12, wherein said file location identifier is a URL on the Internet.

15. The computer program product of claim 12, wherein said file location identifier based fetch is a URL based fetch.

16. The computer program product of claim 12, including:

a search list stored in said memory for defining a set of resources to be searched for locating locally stored files corresponding to ones of said identified symbols.

* * * * *